May 2, 1961    C. M. KUCERA    2,982,367
DETRITUS TRAP FOR WELL DRILL
Filed July 30, 1956
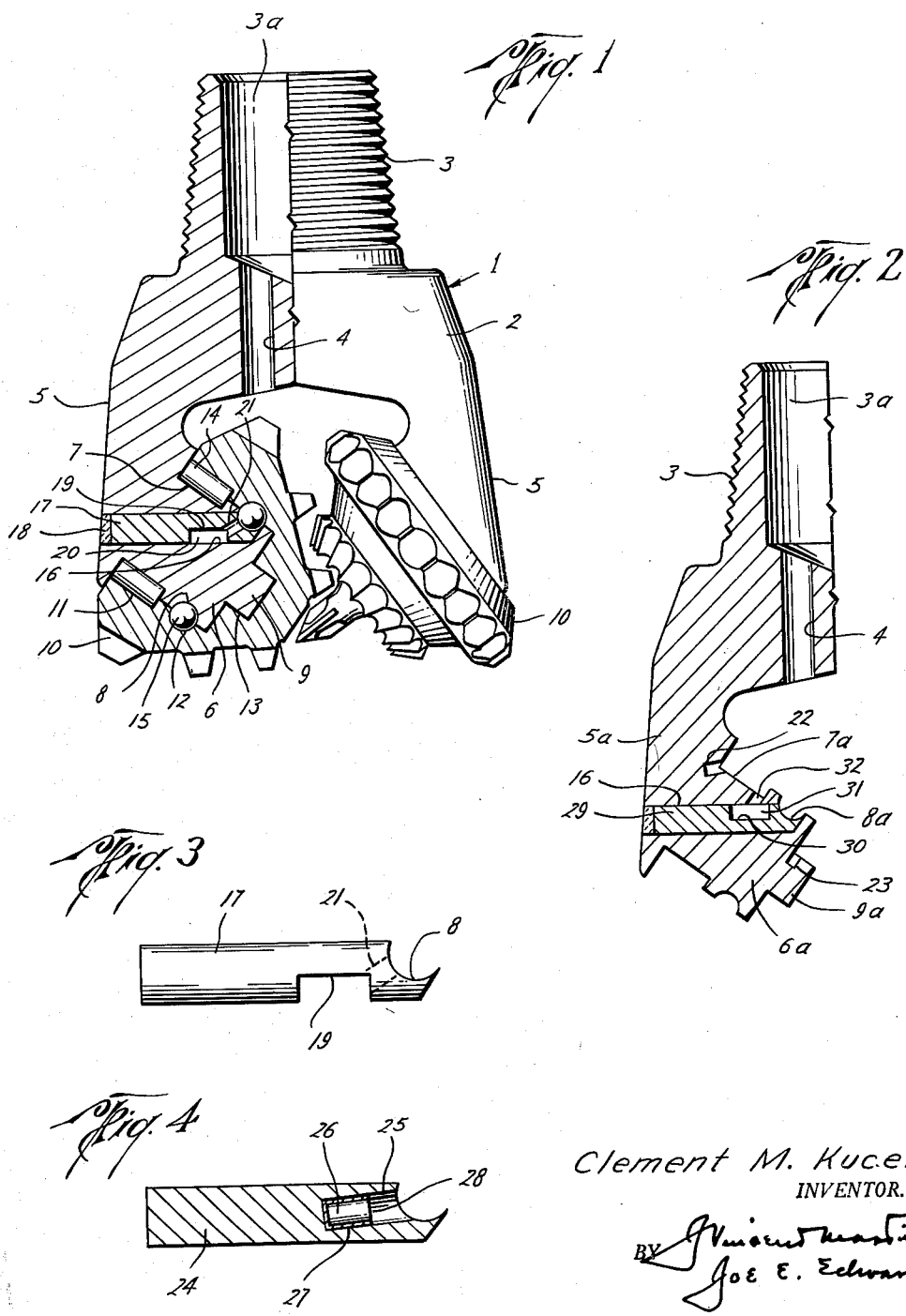
Clement M. Kucera
INVENTOR.
BY J Vincent Martin
Joe E. Edwards
ATTORNEYS United States Patent Office 2,982,367
Patented May 2, 1961

2,982,367

DETRITUS TRAP FOR WELL DRILL

Clement M. Kucera, Houston, Tex., assignor to Reed Roller Bit Company, Houston, Tex., a corporation of Texas Filed July 30, 1956, Ser. No. 601,024

11 Claims. (Cl. 175—328)

This invention relates generally to roller type earth drilling bits.

It is an object of this invention to provide a new and improved bearing arrangement for a roller type drilling bit.

It is another object to provide a new and improved detritus trap within a bearing assembly in a roller type drill bit.

Another object is to provide a magnetic trap for the collection of ferrous particles which may become commingled within the bearing assembly of a roller type drill bit, or which particles may be incident to the wear, spalling or breaking-off of parts within a roller bit during the operation thereof.

Another object is to provide a roller bearing assembly having a socket therein to trap detritus which may be commingled in the said bearing assembly.

Other objects will hereinafter appear.

The preferred embodiments of the invention are illustrated by the following description and accompanying drawings in which:

Fig. 1 is a fragmentary elevation view, partly in section, of a drill bit embodying the invention.

Fig. 2 is a sectional view of a roller drill bit bearing extension and shaft showing modifications of the invention.

Fig. 3 is an enlarged detailed view of the ball retaining plug shown in Fig. 1.

Fig. 4 is an enlarged sectional view of a modified form of a ball retaining plug containing a magnet.

In the drawings a drill bit is shown generally at 1 comprising a head 2 having a threaded shank 3 extending upwardly and adapted to be secured to the lower end of a drill string (not shown). The bit head 2 has a chamber 3a and an opening 4 to receive and discharge drilling fluid pumped downwardly through the drill stem in the usual manner.

Depending downwardly from the bit head 2 are a plurality of bearing extensions 5. A shaft 6 extends inwardly and downwardly from the bearing extension 5. The shaft 6 has a suitable roller bearing race 7; a ball bearing race 8 and a friction pin 9. A cutter 10 is rotatably mounted on the shaft 6. The cutter 10 has a roller race 11; a ball race 12; and a friction bore 13 corresponding and registering respectively with the roller race 7, the ball race 8 and the friction pin 9 of the shaft 6. Suitable roller bearings 14 are provided in the roller race ways, and ball bearings 15 are provided in the ball race ways. The bearing extension 5 and shaft 6 have a bore 16 communicating with the ball race ways 8 and 12. The ball bearings 15 are introduced into the race ways through the bore 16. After the required number of ball bearings 15 are inserted into the ball race ways, a retaining plug 17 is then inserted into the bore 16 and welded at 18 to secure the ball bearings 15 in place. The retaining plug 17 has a portion of its periphery contoured at 19 to form with the wall of the bore 16 a pocket 20. The plug 17 has a passageway 21 communicating between the pocket 20 and the ball race way 8, as is clearly shown in Fig. 3.

When detritus is introduced into drill bit bearings during the manufacture or operation thereof, or when particles which are incidental to the wear, spalling or breaking-off of parts during the operation thereof become commingled in the bearing assembly, they may be carried by the bearings to the opening 21 in the plug 17 whereupon some of the particles will be trapped in the passageway 21 and pocket 20 so that they will not interfere with the subsequent operation of the drill bit bearings.

In Fig. 2, a bearing extension 5a is shown having a shaft 6a. The shaft 6a may have a roller race way 7a; a ball race way 8a and a friction pin 9a. In this modification the bearing extension 5a and the shaft 6a may have therein a socket 22 communicating with the race way 7a, and the friction pin 9a may have a socket 23 communicating with the upper surface of the friction pin 9a. The sockets 22 and 23 may serve to trap detritus which may become commingled in the bearing assembly in a similar manner to that just described. The shaft 6a may have a ball retaining plug 29 in the bore 16. The plug 29 may have a portion of its periphery contoured as at 30 to form with the wall of the bore 16 a pocket 31. The shaft 6a has a passageway 32 communicating between the pocket 31 and the roller raceway 7a to provide a trap for detritus which may be commingled with the drill bit bearings.

Another modification is shown in Fig. 4 wherein the retaining plug 24 may have a socket 25 therein. A permanent magnet 26 shielded by a copper sleeve 27, or other suitable shield, may be inserted into the socket 25. The shield 27 encloses the magnet 26 except at the inner end 28 of the magnet 26. The magnet 26 serves to attract ferrous particles which may be commingled in a drill bit bearing assembly during the operation thereof in a manner similar to that previously described for the other embodiments of this invention.

The invention is not limited to the embodiments herein disclosed. Various modifications, within the scope of the following claims, will occur to those skilled in the art.

I claim:

1. A drill bit comprising a head, a plurality of bearing extensions extending downwardly from said head, shafts extending downwardly and inwardly from said bearing extensions, an approximately conical cutter on each of the said shafts, each of the said shafts having a roller bearing race way; a ball bearing race way; and a friction bearing pin, each of the said cutters having a roller bearing race way; a ball bearing race way; and a friction pin bore; said cutter race ways registering with the corresponding race ways on the said shafts, and said bore with said pin; roller bearings in the said roller race ways and ball bearings in the said ball race ways, each of the said shafts having a bore leading into the said ball race way, the said ball bearings being insertable into said ball race ways through the said bores, a retaining plug insertable into each of the said bores to retain the said balls in said ball race ways, the said retaining plug having a portion of its nether periphery contoured to form with the wall of the said bore a pocket to trap detritus from said race ways, the said plug having a single passage way communicating between the said pocket and the said ball race way, said shaft being so formed to close off the pocket in said plug except to communication from said single passage.

2. A drill bit according to claim 1 wherein the said pocket contains a permanent magnet.

3. A drill bit comprising a head, a plurality of bearing extensions extending downwardly from the said head, shafts extending downwardly and inwardly from the said bearing extensions, a cutter on each of the said shafts, each of the said shafts having a roller bearing race way; a ball bearing race way; and a friction bearing pin, each of the said cutters having a roller bearing race way; a ball bearing race way; and a friction pin bore; said cutter race ways registering with the corresponding race ways on the said shafts, and said bore with said pin; roller bearings in the said roller race ways and ball bearings in the said ball race ways, each of the said shafts having a bore leading into the said ball race way, the said ball bearings being insertable into said ball race ways through the said bores, a retaining plug insertable into each of said bores to retain the said balls in said ball race ways, the said retaining plug having a socket in its inner end to trap detritus from said race ways, said socket opening to the said ball race way, said shaft being so formed to close off the socket in said retaining plug except to communication from said ball raceway.

4. A drill bit according to claim 3 wherein the said socket contains a permanent magnet.

5. A drill bit according to claim 4 wherein the said magnet is shielded about its periphery and at its outer end.

6. A well drill comprising a head, a downwardly extending bearing extension thereon, an inwardly extending shaft on the said bearing extension, a roller cutter on the said shaft, complementary race ways on the said shaft and in said cutter, anti-friction bearings in the said race ways, the said shaft having a bore communicating with said complementary race ways, the said bearings being insertable through said bore, a retaining plug insertable into said bore to retain the said bearings in the said race ways, the said plug having a socket in its inner end opening into the said race ways to form a trap for detritus which may be commingled in the said bearings and race ways, said shaft being so formed to close off the socket in said plug except to communication from said raceways.

7. A well drill according to claim 6 wherein the said socket contains a permanent magnet.

8. A well drill comprising a head, a downwardly extending bearing extension thereon, an inwardly extending shaft on the said bearing extension, a roller cutter on the said shaft, complementary race ways on the said shaft and in said cutter, anti-friction bearings in the said race ways, the said shaft having a bore intersecting with said race ways, the said bearings being insertable through said bore, a retaining plug insertable into said bore to retain the said bearings in the said race ways, the said retaining plug having a portion of its nether periphery contoured to form with the wall of the said bore a pocket to trap detritus from said race ways, the said plug having a single passage way communicating between the said pocket and the said race ways, said shaft being so formed to close off the pocket in said plug except to communication from said single passage.

9. A well drill comprising a head, a downwardly extending bearing extension thereon, an inwardly extending shaft on the said bearing extension, a roller cutter on the said shaft, complementary ball and roller race ways on the said shaft and in the said cutter, ball and roller bearings respectively in the said race ways, the said shaft having a bore extending therethrough to said ball race ways, the said ball bearings being insertable through the said bore, a retaining plug insertable into said bore to retain the said ball bearings in the said ball race ways, the said retaining plug having a portion of its periphery contoured to form with the wall of the said bore a pocket to trap detritus from said race ways, the said shaft having a passageway communicating between the said pocket and the upper surface of said roller bearing raceway, said shaft being so formed to close off the pocket in said plug except to communication from said passageway.

10. A well drill comprising a head, a downwardly extending bearing extension thereon, and an inwardly extending shaft on the said bearing extension, a roller cutter on the said shaft, complementary roller and ball bearing race ways on the said shaft and in said cutter, roller and ball bearings in the said race ways, the said shaft having a socket therein opening into the upper surface of said shaft roller bearing race way, said socket being so formed in said shaft as to be closed off except for communication with the upper surface of said shaft roller bearing race way.

11. A well drill having a cutter rotatably mounted on roller and ball bearings on a shaft, complementary roller and ball bearing race ways on the said shaft and in said cutter, the said shaft having a socket therein, one end of the said socket opening into the upper surface of said shaft roller bearing race way, and the other end thereof being closed.

References Cited in the file of this patent

UNITED STATES PATENTS

| | | |
|---|---|---|
| 474,297 | Hoffman | May 3, 1892 |
| 2,661,932 | Woods | Dec. 8, 1953 |
| 2,664,321 | Noble | Dec. 29, 1953 |